US011135601B2

(12) United States Patent
    Bartoli

(10) Patent No.: US 11,135,601 B2
(45) Date of Patent: Oct. 5, 2021

(54) CENTRIFUGAL SEPARATOR OF GAS—LIQUID FOR ELECTROCHEMICAL BATTERY

(71) Applicant: LEONARDO S.p.A., Rome (IT)

(72) Inventor: Dino Bartoli, Leghorn (IT)

(73) Assignee: LEONARDO S.p.A., Rome (IT)

( * ) Notice: Subject to any disclaimer, the term of this patent is extended or adjusted under 35 U.S.C. 154(b) by 30 days.

(21) Appl. No.: 16/808,976

(22) Filed: Mar. 4, 2020

(65) Prior Publication Data
    US 2020/0282409 A1    Sep. 10, 2020

(30) Foreign Application Priority Data
    Mar. 5, 2019   (IT) ........................ 102019000003185

(51) Int. Cl.
    *B01D 19/00*    (2006.01)
    *B04C 3/06*    (2006.01)
    (Continued)

(52) U.S. Cl.
    CPC ............ *B04C 3/06* (2013.01); *B01D 19/0057* (2013.01); *B01D 19/0063* (2013.01);
    (Continued)

(58) Field of Classification Search
    CPC ....... B04C 3/06; B04C 3/00; B04C 2003/003; B04C 11/00; B04C 5/04; B04C 5/13; B01D 19/0057; B01D 19/0063; B01D 45/16; B01D 45/12; B01D 50/002; H01M 8/04276; H01M 8/188; H01M 2250/20;
    (Continued)

(56) References Cited

U.S. PATENT DOCUMENTS 2,057,257 A * 10/1936 Walker ............... B01D 19/0057
                                                          95/258
2,068,048 A * 1/1937 Adams ............... B01D 46/2403
                                                          55/318
(Continued)

FOREIGN PATENT DOCUMENTS

CN    105 381 891    3/2016
EP    1 839 721    10/2007
(Continued)

*Primary Examiner* — Dung H Bui
(74) *Attorney, Agent, or Firm* — Leason Ellis LLP

(57) ABSTRACT

A centrifugal gas-liquid separator wherein a tubular casing houses a central tubular duct, which is provided with a first free end and with a second end that communicates with a gas-outlet duct and carries a transversal annulus-shaped plate having a perimetral edge that faces the inner wall of the tubular body to define an annular gap. The plate divides the space inside the tubular casing into a first chamber and into a second chamber that communicate with each other through the annular gap. A liquid-outlet duct communicates with the second chamber and a liquid-phase/gas-phase inlet duct extends tangentially from the tubular casing and discharges into the first chamber through an inlet nozzle. A regulation device is provided, which is designed to modify the section of the inlet nozzle in order to modify the rate of entry of the liquid phase and gas phase into the first chamber and to adapt the operation of the centrifugal gas-liquid separator following variations of flow rate.

7 Claims, 4 Drawing Sheets

(51) Int. Cl.
*B01D 45/12* (2006.01)
*B01D 45/16* (2006.01)
*H01M 8/04276* (2016.01)
*H01M 8/18* (2006.01)
*B04C 3/00* (2006.01)
*B04C 11/00* (2006.01)
*B01D 50/00* (2006.01)
*B04C 5/04* (2006.01)
*B04C 5/13* (2006.01)
*A47L 9/16* (2006.01)

(52) U.S. Cl.
CPC ............. *B01D 45/12* (2013.01); *B01D 45/16* (2013.01); *A47L 9/1608* (2013.01); *A47L 9/1683* (2013.01); *B01D 50/002* (2013.01); *B04C 3/00* (2013.01); *B04C 5/04* (2013.01); *B04C 5/13* (2013.01); *B04C 11/00* (2013.01); *B04C 2003/003* (2013.01); *H01M 8/04276* (2013.01); *H01M 8/188* (2013.01); *H01M 2250/20* (2013.01); *Y02E 60/50* (2013.01); *Y10S 55/03* (2013.01)

(58) Field of Classification Search
CPC ...... Y02E 60/50; A47L 9/1683; A47L 9/1608; Y10S 55/03
See application file for complete search history.

(56) References Cited

U.S. PATENT DOCUMENTS

| | | | | |
|---|---|---|---|---|
| 2,696,273 A * | 12/1954 | Wintermute | ............. | B03C 3/14 96/61 |
| 3,129,173 A * | 4/1964 | Schulze | .................. | B04C 5/04 210/512.1 |
| 3,513,642 A * | 5/1970 | Cornett | ................. | B01D 50/00 55/399 |
| 4,409,008 A * | 10/1983 | Solymes | ................ | B01D 45/12 55/339 |
| 5,961,701 A * | 10/1999 | Hlynsky | ................ | B01D 45/12 55/355 |
| 6,599,348 B2 * | 7/2003 | Chosnek | ............... | B01D 45/12 55/416 |
| 2001/0005986 A1* | 7/2001 | Matsubara | ............. | B04C 5/103 55/459.1 |
| 2003/0172632 A1 | 9/2003 | Matsubara et al. | | |
| 2005/0066469 A1 | 3/2005 | Oh et al. | | |
| 2007/0084158 A1* | 4/2007 | Fester | ................... | B01D 45/16 55/337 |
| 2012/0055125 A1* | 3/2012 | Manska | ................ | A47L 7/0071 55/394 |
| 2017/0112341 A1* | 4/2017 | Han | ...................... | A47L 9/1608 |

FOREIGN PATENT DOCUMENTS

| | | |
|---|---|---|
| JP | 2001 246216 | 9/2001 |
| WO | WO 03/072987 | 9/2003 |
| WO | WO 2009/056264 | 5/2009 |

* cited by examiner

CENTRIFUGAL SEPARATOR OF GAS—LIQUID FOR ELECTROCHEMICAL BATTERY

CROSS-REFERENCE TO RELATED APPLICATIONS

This patent application claims priority from Italian patent application no. 102019000003185 filed on Mar. 5, 2019, the entire disclosure of which is incorporated herein by reference.

TECHNICAL FIELD

The present invention relates to a centrifugal gas-liquid separator for an electrochemical battery.

BACKGROUND OF INVENTION

The production of electrical energy in underwater vehicles, in particular torpedoes, is obtained by means of electrochemical batteries that use a liquid electrolyte and metal electrodes immersed in the electrolyte.

As well as being highly exothermic, the electrochemical reaction of oxidation-reduction on which the formation of electrical potentials is based results in the production of gas, which is contained inside the casing that houses the electrolyte. The electrolyte thus becomes a two-phase system (gas-liquid) and loses part of its chemical-physical characteristics, compromising the operation of the battery.

For this reason, known types of electrochemical batteries are provided with a gas-liquid separator inside which the two-phase electrolyte and gas solution is introduced by operating a pump; the separator has an outlet for the liquid phase, which is recirculated inside the battery, and an outlet for the gas phase, which is discharged outside the torpedo.

FIG. 1, which represents the known art, shows a centrifugal gas-liquid separator comprising:
- a cylindrical tubular casing coaxial about an axis and closed, on one side, by a base wall perpendicular to the axis and, on the other side, by a generally flat plug;
- a central tubular duct, which is coaxially housed inside the tubular casing and is provided with a first free end facing the plug and a second end that passes through the base wall and discharges into a gas-outlet duct;
- an annulus-shaped plate, carried by the central tubular duct and arranged in a direction transverse to the axis; the plate having a perimetral edge, which faces the inner wall of the cylindrical tubular body to define an annular gap; the plate dividing the space inside the cylindrical tubular casing into a first chamber delimited in an axial direction by the plug and by the plate and a second chamber axially delimited by the plate and by the base wall, the first and the second chambers communicating with each other through the annular gap;
- a liquid-outlet duct, which passes through the tubular casing and opens into the second chamber; and
- a liquid-phase/gas-phase inlet duct, which extends tangentially from the tubular casing and leads into the first chamber in the proximity of the plug through an inlet nozzle.

The two-phase electrolyte is injected at high speed into the first chamber under the action of a pump; as a result of the centrifugal force, the liquid phase, which has a higher density, moves close to the inner wall of the cylindrical casing, while the gas, which has lower density, remains innermost, i.e. closer to the tubular duct.

The liquid close to the cylindrical tubular casing flows into the annular gap and reaches the second chamber, from which the liquid is discharged through the liquid-outlet duct, while the gas remains entrapped in the first chamber. The gas contained in the first chamber flows into the first end of the tubular duct and from there is conveyed to the gas-outlet duct.

The above-described separator is a static system formed by parts that, once assembled, do not have any moving parts, as the circulation of the fluid is generated by an external pump.

The energy efficiency of the battery can be optimized by adapting the flow rate of the electrolyte to the power generated, according to a general rule that envisages higher electrolyte flows at higher working electrical powers. This means that if the required power is variable over time, the gas separator must be able to operate with variable flow rates to enable the system to maintain an acceptable efficiency as the electrical power requirement varies.

As described above, the fluid must be injected in the first chamber with a certain velocity V to achieve the centrifugal force necessary to obtain separation of the liquid and gas phases, this velocity V depends on the section of the inlet nozzle and on the flow rate Q from the pump, according to the following relation:

$V = Q/S$
$V$ = rate of entry in the first chamber through the nozzle;
$Q$ = electrolyte flow rate determined by the pump;
$S$ = nozzle section;

The centrifugal force, to which the fluid set in rotation is subjected, is:
$F = m*V^2/R$
$m$ = mass
$R$ = centrifuge radius Known types of gas-liquid separators are designed to work at a nominal flow rate Q and have different performances when the rate of entry of the two-phase electrolyte is changed, resulting in a substantial variation in the centrifugal force and therefore of the capacity of separating the liquid phase and the gas phase.

The object of the present invention is to provide a centrifugal gas-liquid separator that does not suffer from the problems of the known art.

A separator according to the known art is described in document JP 2001 246216.

ABSTRACT OF INVENTION

This object is reached by the present invention in so far as it relates to a centrifugal gas-liquid separator of the type described in claim 1.

BRIEF DESCRIPTION OF THE DRAWINGS

The invention will now be described with reference to the accompanying drawings that represent a non-limitative embodiment, in which.

DETAILED DESCRIPTION OF INVENTION

Figure 1:
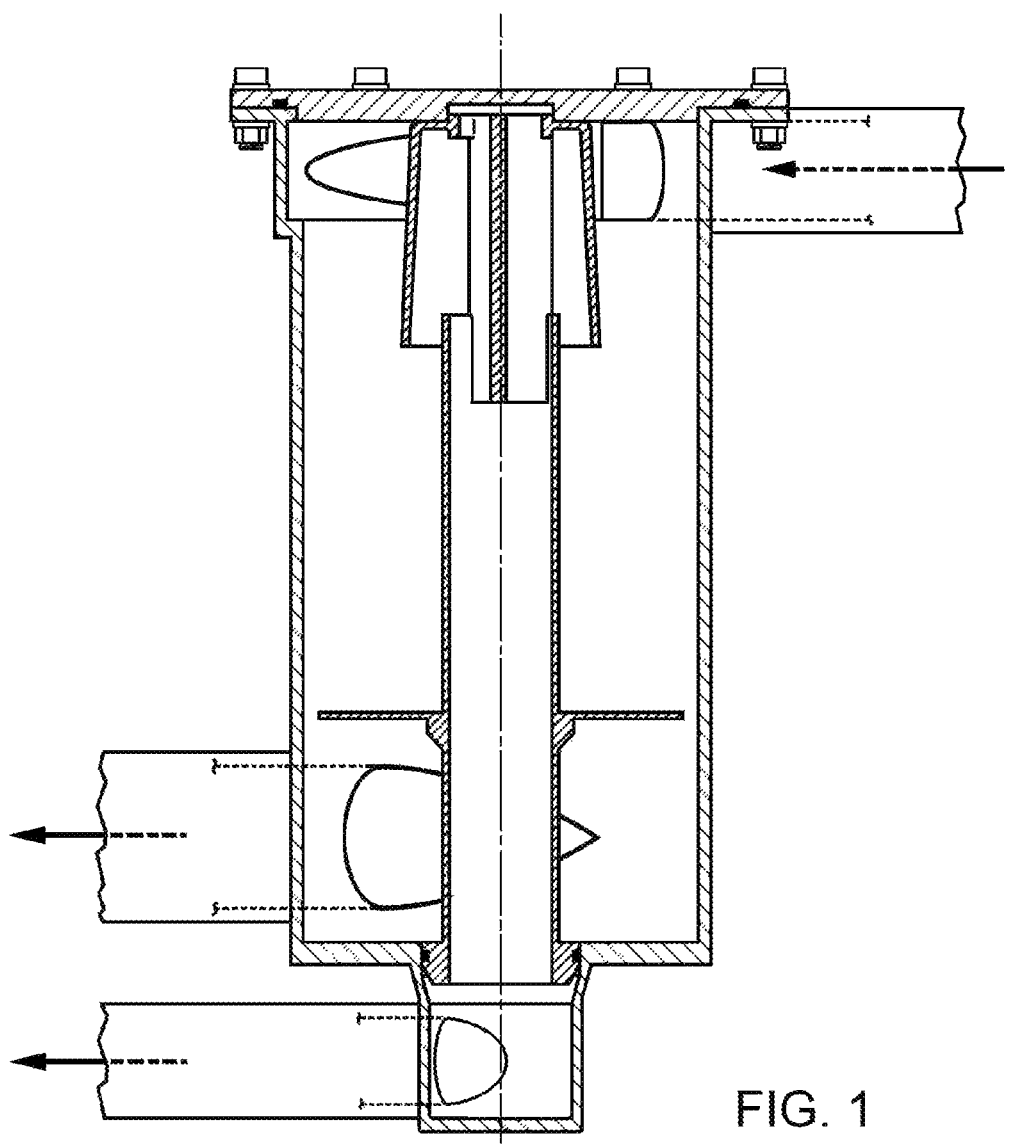
FIG. 1 shows a centrifugal gas-liquid separator made according to the known art.
Figure 1:
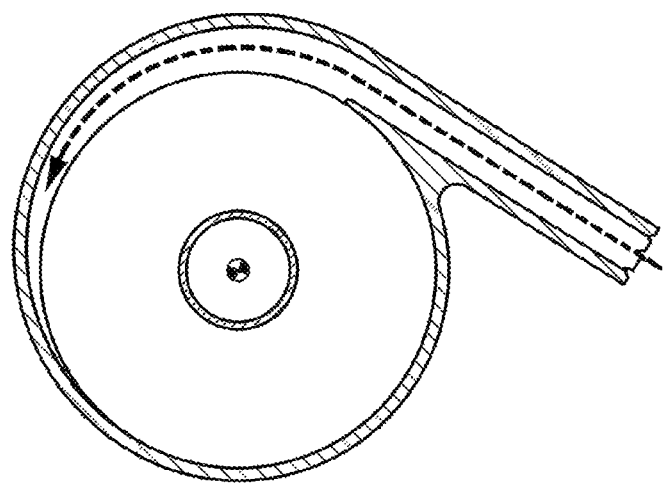
Figure 2:
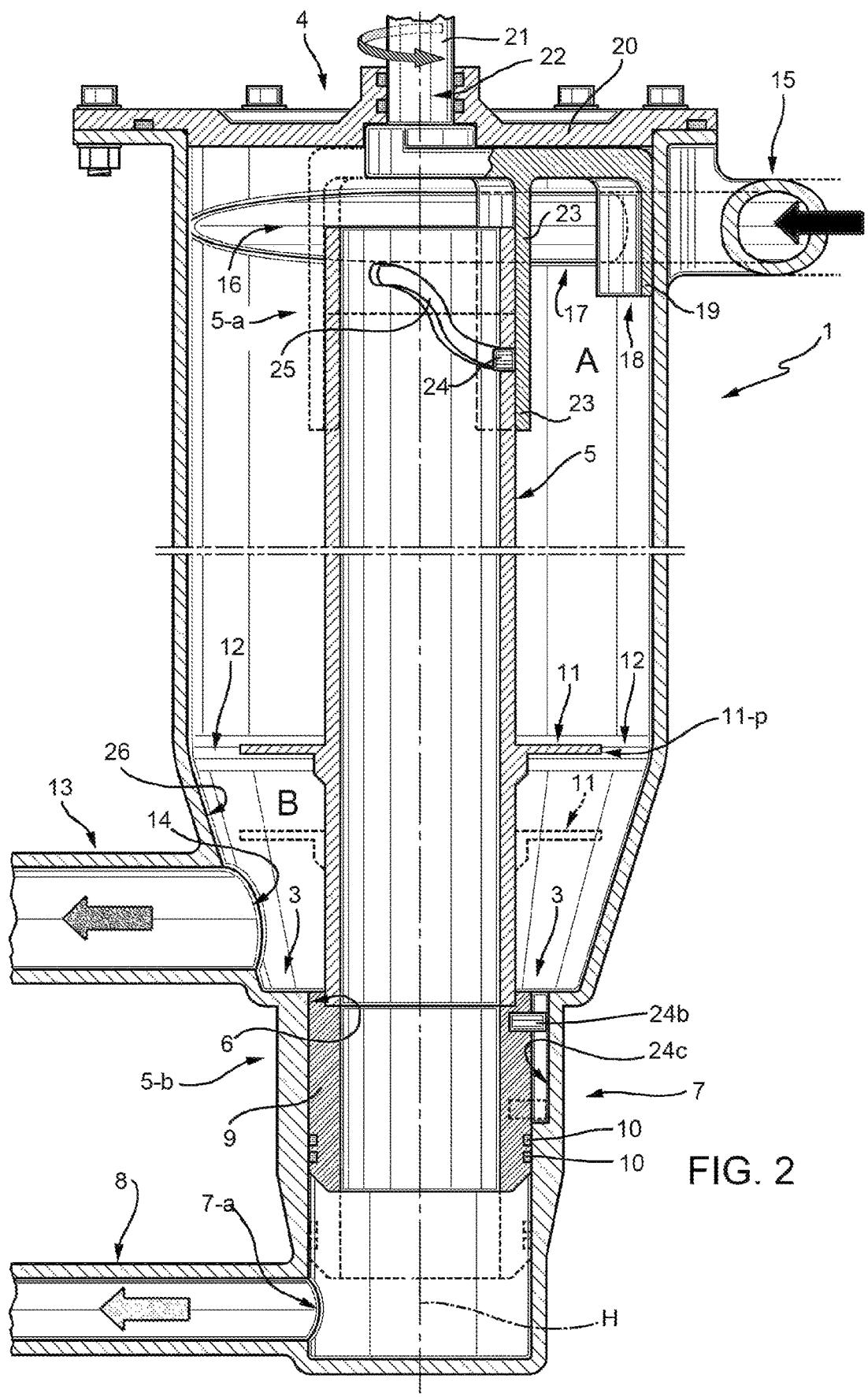
FIG. 2 shows, in longitudinal section, a centrifugal gas-liquid separator made according to the present invention.

With reference to FIG. 2, the reference numeral 1 indicates, as a whole, a centrifugal gas-liquid separator that can be used in an electrochemical battery (not shown) used for the generation of electrical energy in underwater vehicles, in particular a torpedo.

The centrifugal gas-liquid separator 1 comprises:
- a tubular casing 2, coaxial to an axis H, closed, on one side, by a flat base wall 3 perpendicular to the axis H and, on the other side, by a generally flat plug 4;
- a central cylindrical tubular duct 5, which is coaxially housed inside the tubular casing 2 and is provided with a first free end 5-a facing the plug 4 and a second end 5-b that passes through a central opening 6 of the base wall 3 and discharges into a cup-shaped appendage 7, which extends axially from the base wall 3 towards to the outside of the casing 2. The cup-shaped appendage 7 communicates through an opening 7-a with a gas-outlet duct 8, which extends radially from the tubular casing 2.

The second end portion 5-b is provide with a tubular end duct 9 that extends towards the outside and which is provided with a groove that houses a sealing ring 10 designed to slide on the inner walls of the cup-shaped appendage 7.

The separator 1 also comprises an annulus-shaped plate 11, carried by the central tubular duct 5 and arranged transversely to the axis H. The plate 11 has a perimetral edge 11-p, which faces the inner wall of the tubular casing 2 to define an annular gap 12.

In this way, the plate 11 divides the space inside the tubular casing 2 into a first chamber A axially delimited by the plug 4 and by the plate 11 and into a second chamber B axially delimited by the plate 11 and by the base wall 3, the first chamber A and the second chamber B communicating with each other through the annular gap 12.

The separator 1 also comprises a liquid-outlet duct 13, which extends from the tubular casing 2 and opens into the second chamber B through an opening 14, and a liquid-phase/gas-phase inlet duct 15, which extends tangentially from the tubular casing 2 (see FIGS. 2 and 3) and discharges into the first chamber A in the proximity of the plug 4 through an opening that forms an inlet nozzle 16.

According to the present invention, a first regulator 17 is provided, which is designed to modify the section of the inlet nozzle 16 in order to modify the rate of entry of the liquid phase and gas phase inside the second chamber B and adapt the operation of the centrifugal gas-liquid separator 1 following variations of flow rate.

Figure 3:
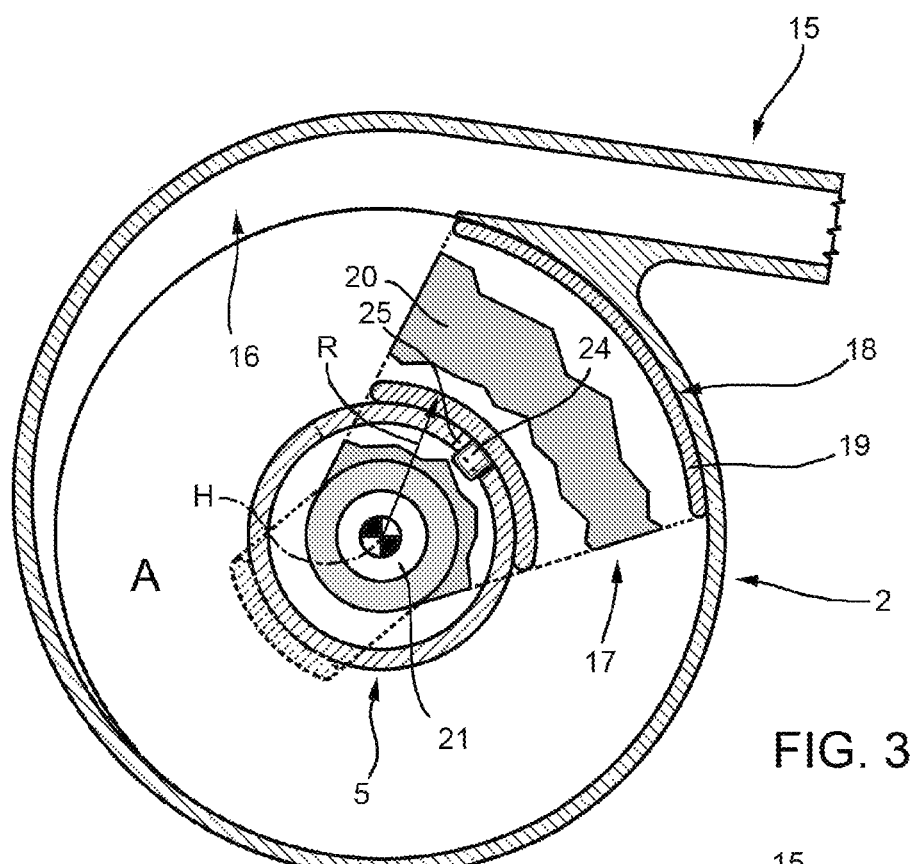
FIGS. 3 and 4 show, in cross-section, an end portion of the separator of FIG. 2.

In particular, following a decrease in the flow rate Q of the liquid-gas phase fed to the duct 15, the section of the nozzle (FIG. 4) is decreased in order to increase the injection speed of the liquid phase and gas phase into the first chamber A, while following an increase in the flow rate Q of the liquid-gas phase fed to the duct 15, the section of the nozzle is increased (FIG. 3). In this way, by modifying the section of the nozzle 16 in response to variations in flow rate, the rate of entry of the liquid-gas phase into chamber A can be made constant, thus ensuring that the separator 1 always works under optimal conditions. In other words, the same centrifugal force is applied to the fluid entering the first chamber A even when the working flow rate varies.

Figure 4:
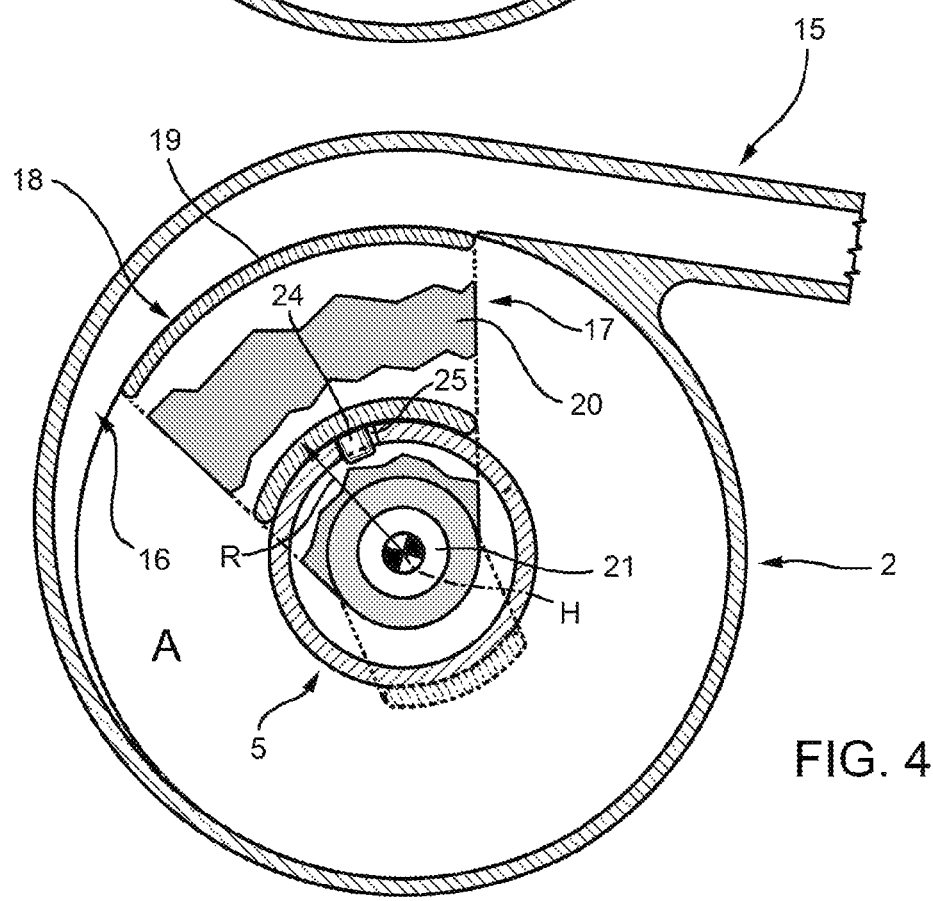
Figure 5:
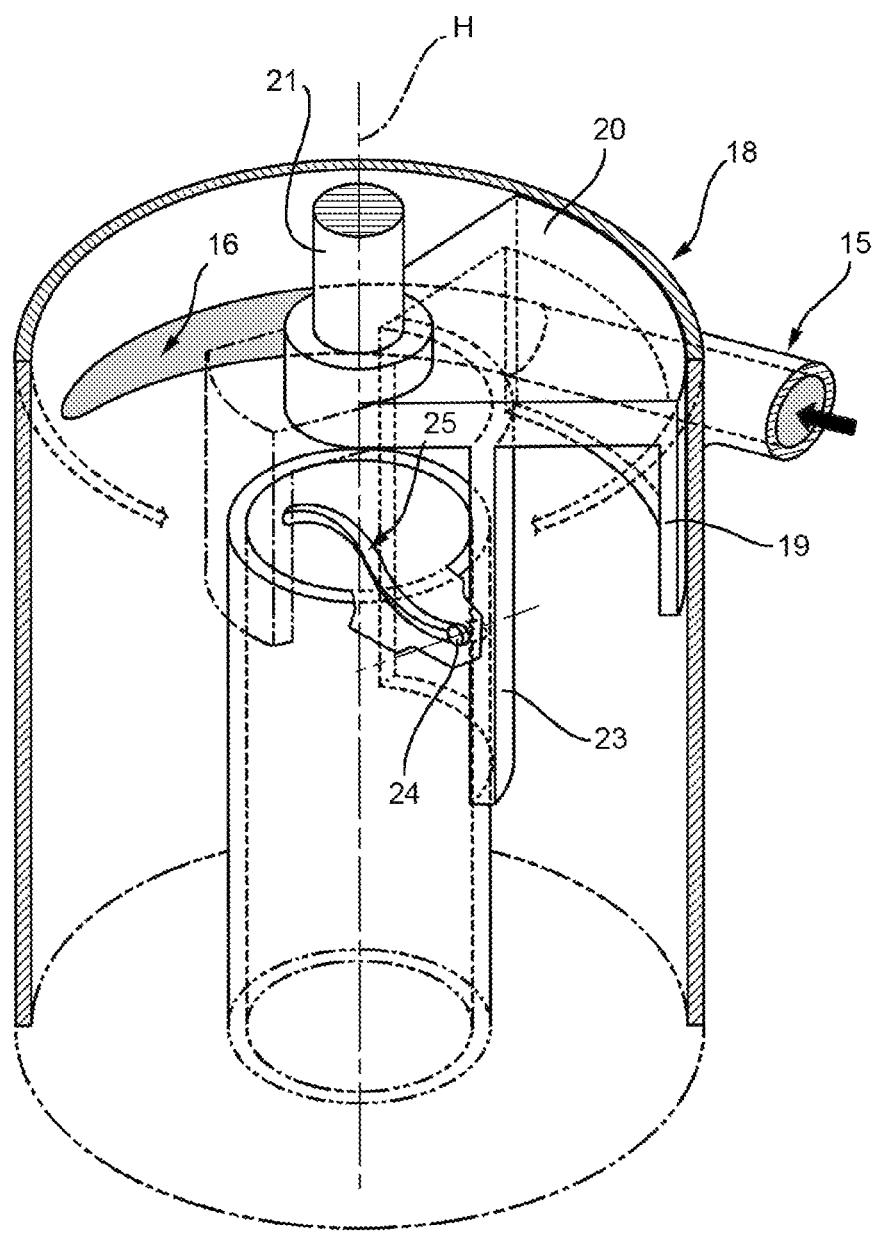
FIG. 5 shows, in a perspective view, a detail of the separator of FIGS. 2 to 4.

With reference to FIG. 5 and to FIGS. 2, 3 and 4, the first regulator 17 comprises a deflector 18 housed in the first chamber A, angularly movable about the axis H between a first end-of-travel position (FIG. 3, maximum opening of nozzle 16), in which the inlet opening is free, and a second end-of-travel position (FIG. 4, minimum opening of nozzle 16), in which the deflector 18 is arranged to cover a predetermined portion of the inlet opening; the angular arrangement of the deflector 18 between the end-of-travel positions enables continuous variation of the section of the nozzle 16.

In greater detail, the deflector 18 comprises a portion of cylindrical wall 19 shaped for being arranged facing the inner cylindrical wall of the tubular casing 2 (see FIG. 5) for covering the nozzle 16, a flat tapered appendage 20 (approximately triangular), which extends from an edge of larger side of the portion of cylindrical wall 19, and a regulation pin 21, which extends axially from an end portion of the tapered appendage 20 in the direction opposite to the to the cylindrical wall with respect to the appendage 20.

The deflector 18 is arranged in such a way that the flat tapered appendage 20 (FIG. 2) is arranged beneath the flat plug 4 and is transversal to the axis H, and the regulation pin 21 protrudes from a central opening 22 of the flat plug 4, passing through the latter. The regulation pin 21 is conveniently connected to an actuator (not shown) to implement the angular movement of the deflector 18.

The deflector 18 also comprises a further portion of cylindrical wall 23 arranged coaxially to the portion of cylindrical wall 19 and spaced from the axis H by a distance R (FIGS. 3 and 4) that is slightly more than the diameter of the cylindrical tubular duct 5.

The portion of cylindrical wall 23 is provided with a regulation pin 24 that extends towards the axis H and therefore towards the free end 5-a of duct 5 where it engages a pseudo-helical groove 25, which extends on the outer surface of the tubular duct 5. Due to the constraint established between the pin 24 and the groove 25, following rotation of the deflector 18 in angularly opposite directions about the axis H, the tubular duct 5 axially moves in opposite directions along the axis H. Rotation of the duct 5 about the axis H is prevented by the constraint established between a pin 24b that engages a seat 24c made inside the cup-shaped appendage 7 and extending along the axis H. The inner wall 26 (FIG. 2) of the second chamber B has a frustoconical shape with a diameter decreasing towards the base wall 3; due to the above-described mechanism, following rotation of the deflector 18, the plate 11 is axially movable inside the second chamber B, the movement of the plate 11 along the axis H changes the distance of the perimetral edge with respect to the frustoconical wall, by modifying the radial dimensions of the gap 12.

A second regulator 27 is thus provided that is designed to vary the radial dimensions of the annular gap 12 to adjust the separator to variations in flow rate of the liquid phase and gas phase.

In fact, in the case of an increase in flow rate, the liquid phase that comes into contact with the inner wall of the tubular casing due to the centrifugal effect increases in thickness and the amount of fluid that is drawn through the gap 12 might be insufficient and the first chamber A might fill up with liquid, thus compromising the liquid-gas separation. This effect is prevented by the present invention because the radial dimensions of the gap 12 can be varied, in particular increased in the case of an increase in the flow rate.

Since the rotation of the deflector 18 produces both the variation in the section of the nozzle 16 and the variation in the radial dimensions of the gap 12, the first regulator 17 and the second regulator 27 are movable in a synchronised manner with respect to one another. In particular, as the section of the nozzle 16 decreases, the radial dimension of the gap 12 decreases (see broken line in FIG. 2) and as the section of the nozzle 16 increases, the radial dimension of the gap 12 increases (see solid line in FIG. 2).

If the flow rate rises, it is necessary to increase the dimensions of the nozzle 16 to decrease the velocity and, at the same time, as the amount of fluid to transfer from the first chamber A to the second chamber B increases, it is consequently necessary to increase the radial dimension (and hence the area) of the gap 12.

Instead, if the flow rate drops, it is necessary to decrease the dimensions of the nozzle 16 in order to increase the speed and, at the same time, as the amount of fluid to transfer from the first chamber A to the second chamber B also decreases in thickness, it is consequently necessary to decrease the radial dimension (and therefore the area) of the gap 12 in order to prevent all of the two-phase mass passing through the gap 12 without the required separation being performed.

The invention claimed is:

1. A centrifugal gas-liquid separator (1) comprising:
    a tubular casing (2), coaxial about an axis (H) and closed, on one side, by a base wall (3) transverse to the axis (H) and, on the other side, by a plug (4);
    a central tubular duct (5), which is coaxially housed inside the tubular casing (2) and is provided with a first free end (5-a) facing the plug (4) and a second end (5-b) that communicates with a gas-outlet duct (8);
    an annulus-shaped plate (11), carried by the central tubular duct (5) and arranged in a direction transverse to the axis (H); the plate (11) having a perimetral edge (11-p), which faces the inner wall of the tubular body (2) to define an annular gap (12); the plate (11) dividing the space inside the tubular casing (2) into a first chamber (A) delimited in an axial direction by the plug (4) and by the plate (11) and a second chamber (B) axially delimited by the plate (11) and by the base wall (3), the first chamber (A) and the second chamber (B) communicating with each other through the annular gap (12);
    a liquid-outlet duct (13), which communicates with the second chamber (B); and
    a liquid-phase/gas-phase inlet duct (15), which extends tangentially from the tubular casing (2) and discharges into the first chamber (A) in the proximity of the plug (4) through an inlet nozzle (16),
    wherein a first regulation means (17) is designed to modify the section of the inlet nozzle (16) in order to modify the rate of entry of the liquid phase and gas phase into said first chamber (A) and adapt operation of said centrifugal gas-liquid separator following variations of flow rate;
    said separator further comprises a second regulation means (27) designed to vary the radial dimensions of said annular gap (12) in order to adapt said separator to variations of flow rate of the liquid phase and of the gas phase.

2. The separator according to claim 1, wherein said inlet duct opens towards the first chamber through an inlet opening provided in the cylindrical wall of the tubular casing; and said first regulation means (17) comprise a deflector (18) housed in the first chamber (A), angularly mobile about the axis (H) between a first end-of-travel position, in which the inlet opening is free, and a second end-of-travel position, in which the deflector is arranged for covering a pre-set portion of said inlet opening, an angular arrangement of the deflector between the end-of-travel positions enabling continuous variation of the section of said nozzle.

3. The separator according to claim 2, wherein said deflector comprises a portion of cylindrical wall (19) shaped for facing the inner cylindrical wall of the tubular casing (2), a tapered appendage (20), which extends from an edge of the larger side of the portion of cylindrical wall and a regulation pin (21), which extends axially from an end portion of the tapered appendage (20) and engages a hole (22) of said plug (4), traversing said hole (22).

4. The separator according to claim 1, wherein said second regulation means (27) comprise an inner wall (26) of said second chamber (B) having a frustoconical shape with a diameter decreasing towards the base part (3) and said plate (11), which is axially mobile within the second chamber (B) so that the perimetral edge (11-p) of the plate (11) has a variable distance from the frustoconical wall according to the axial position assumed by the plate (11).

5. The separator according to claim 1, wherein said plate (11) is stably carried by said tubular duct (5), which is mobile in an axial direction (H) for regulating the radial dimensions of said gap (12).

6. The separator according to claim 1, wherein the first regulation means (17) and the second regulation means (27) are movable in a synchronised manner with respect to one another.

7. The separator according to claim 6, wherein the first regulation means (17) and the second regulation means (27) are movable in a synchronised manner with respect to one another such that, with the reduction in section of the inlet nozzle (16), the radial dimension of the gap (12) decreases, and vice versa.

* * * * *